United States Patent [19]

Krantz

[11] Patent Number: 4,581,050

[45] Date of Patent: Apr. 8, 1986

[54] DUST COLLECTOR

[75] Inventor: Anders Krantz, Söderala, Sweden

[73] Assignee: Industriell Arbetshygien i Söderhamn AB, Söderhamn, Sweden

[21] Appl. No.: 641,968

[22] PCT Filed: Dec. 6, 1983

[86] PCT No.: PCT/SE83/00428

§ 371 Date: Aug. 9, 1984

§ 102(e) Date: Aug. 9, 1984

[87] PCT Pub. No.: WO84/02282

PCT Pub. Date: Jun. 21, 1984

[30] Foreign Application Priority Data

Dec. 13, 1982 [SE] Sweden ............................ 8207099

[51] Int. Cl.⁴ ............................................. B01D 50/00
[52] U.S. Cl. ........................................ 55/269; 55/334; 55/337; 55/367; 55/379; 55/380; 55/416; 55/429; 55/432; 55/487; 55/498
[58] Field of Search ............... 55/315, 269, 323, 337, 55/334, 356, 357, 366, 367, 373, 374, 378–381, 429, 498, 486, 487, 432, 416; 15/340, 351, 353

[56] References Cited

U.S. PATENT DOCUMENTS

| | | | |
|---|---|---|---|
| 2,467,503 | 4/1949 | Scriven | 55/373 |
| 2,596,807 | 5/1952 | Dippel | 55/367 |
| 2,729,303 | 1/1956 | McMahan | 55/357 |
| 3,146,081 | 8/1964 | Emdy. | |
| 3,172,743 | 3/1965 | Kowalewski | 55/380 |
| 3,240,000 | 3/1966 | Hayes et al. | 55/337 |
| 3,308,609 | 3/1967 | McCullock | 55/337 |
| 3,543,325 | 12/1970 | Hamrick | 55/459 |
| 4,229,193 | 10/1980 | Miller. | |
| 4,467,494 | 8/1984 | Jones | 55/379 |

FOREIGN PATENT DOCUMENTS

| | | | |
|---|---|---|---|
| 0033250 | 8/1981 | European Pat. Off. | 55/337 |
| 0069537 | 1/1983 | European Pat. Off. . | |
| 460336 | 6/1926 | Fed. Rep. of Germany | 55/416 |
| 934293 | 8/1963 | United Kingdom | 55/337 |

*Primary Examiner*—Bernard Nozick
*Attorney, Agent, or Firm*—Spencer & Frank

[57] ABSTRACT

A dust collector including two tubes which communicate through an interconnecting conduit. A first tube operates as a cyclone which separates a great fraction of dust or solid components from the incoming air and collects the same in a bag at the bottom of the tube. The second tube includes a filter unit composed of a coarser filter as well as a surrounding fine filter, the filter unit receiving the pre-purified air from the cyclone tube through the interconnecting conduit and separating the remaining dust particles therefrom.

20 Claims, 8 Drawing Figures

DUST COLLECTOR

TECHNICAL FIELD

This invention refers to a dust collector comprising two communicating casings or tubes a first one of which is arranged to receive dust-laden air from outside and separate therefrom at least coarser particles or components by collecting these at a bottom of the tube, while the second tube embraces a filter unit arranged to separate the remaining particles from the pre-purified air arriving from the first tube before the air leaves the collector, the two tubes being interconnected by means of a conduit extending between the tops of the tubes. Particularly, though not exclusively, the invention refers to dust collectors of the type which are designed for industrial use, e.g. for cleaning building work places, factory floors or the like.

BACKGROUND ART

A dust collector of the above-mentioned type is previously known by the U.S. Pat. No. 3,146,081. In that apparatus the dust-laden air is taken into the coarse separating tube through a duct which extends radially out from the cylindrical tube wall and enters the tube at a point situated below a conical deflector which converges downwardly and is attached to the inside of the tube in order to divide the same in upper and lower chambers. By this design the air taken in will get a turbulent uncontrolled movement which results in a very great fraction of the dust or solid components in the air accompanying the same past the deflector and into the subsequent filter unit. Therefore the latter tends to be rapidly clogged. Further the filter unit consists of a single bag which either—in case it is manufactured with a loose fibre structure—will let a great fraction of fine particles through, or—in case it is manufactured with a fine fibre structure—is clogged extremely rapidly.

BRIEF DISCLOSURE OF THE INVENTION

The present invention aims at eliminating the above-mentioned disadvantages and producing a dust collector which is capable of effectively cleaning air from extremely coarse as well as extremely fine components while maintaining a long lifetime of the filter unit. According to the invention this is achieved by the facts that the first tube consists of a cyclone including an air intake duct which is located in the vicinity of the top of the tube and which, in a manner known per se, extends tangentially in relation to the tube so as to set the sucked-in air in a circulating movement directed downwardly towards the bottom of the tube, as well as a conical funnel which is located between said intake duct and the bottom of the tube and the greatest diameter of which is smaller than the diameter of the tube in order to allow the air to pass the funnel and the inside of the tube, said funnel converging upwardly towards the top of the tube so as to pick up at the lower part thereof the pre-purified air flowing up from the bottom of the tube and pass it on to the second tube through said interconnecting conduit, and that the filter unit in the second tube includes at least two concentrically in each other arranged bag- or shall-like filter elements the interior one of which serves as a coarse filter first receiving the accepted air from the cyclone tube, said element having a relatively loose structure, while the exterior one serves as a fine- or micro-filter having a more compact structure than the coarse filter, said coarse filter and fine filter respectively being mountable as well as dismountable as one single integral unit in said second tube.

By the fact that one of the two tubes consists of a cyclone the dust collector according to the invention will give a very effective coarse separation (in practice 70% or more) of the solid particles contained in the incoming air; meaning that the accepted air which is passed on to the filter unit will contain only a comparatively small fraction of contaminations. Hence it follows that the filter unit will get a long lifetime. By the fact that the filter unit is composed of a coarse filter first receiving the air coming in from the cyclone tube as well as a fine filter arranged on the outside of the coarse filter the filter unit in its entirety will effectively separate not only coarse and medium coarse components but simultaneously also those extremely fine particles which penetrate the coarse filter; a further important advantage being that the coarse filter and fine filter are always changed at the same time, thereby securing a fine filtering action as soon as a unit is mounted in the associated tube. Thus the combination of the far-reaching coarse separation brought about in the cyclone tube and the effective separation of even extremely fine particles achieved in the filter unit provides a dust collector assembly which emits filtered air of a very high degree of purity and which can operate during long periods between the necessary filter exchanges.

FURTHER ELUCIDATION OF THE PRIOR ART

By the U.S. Pat. No. 4,229,193 a filter unit is previously known which includes two bags arranged one within the other. In this case the two bags do not, however, have different filter characteristics, i.e. fibre structures of different coarseness in order to form a coarse filter and a fine filter. Nor is the air passed into an inner bag serving as a coarse filter and thereafter passed out through an outer bag serving as a fine filter.

DETAILED DESCRIPTION OF A PREFERRED EMBODIMENT OF THE INVENTION

Figure 1:
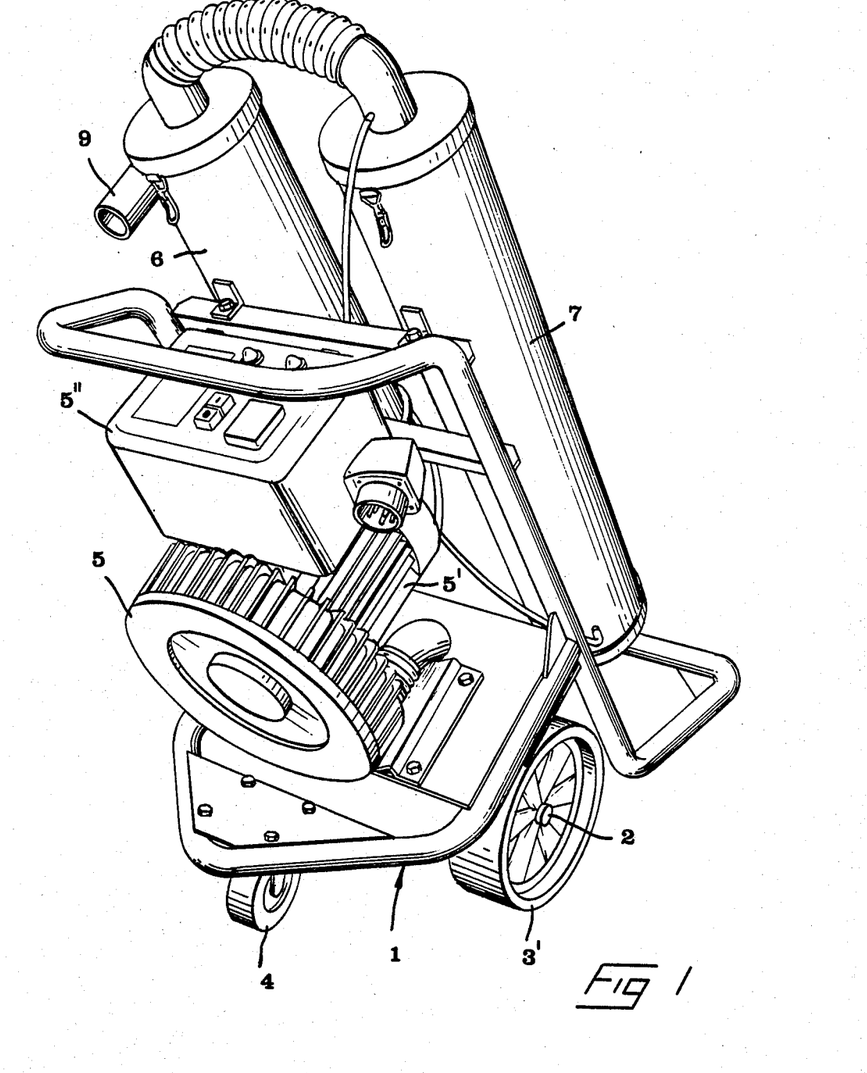
FIG. 1 is a perspective view of a dust collecting assembly according to the invention.
Figure 2:
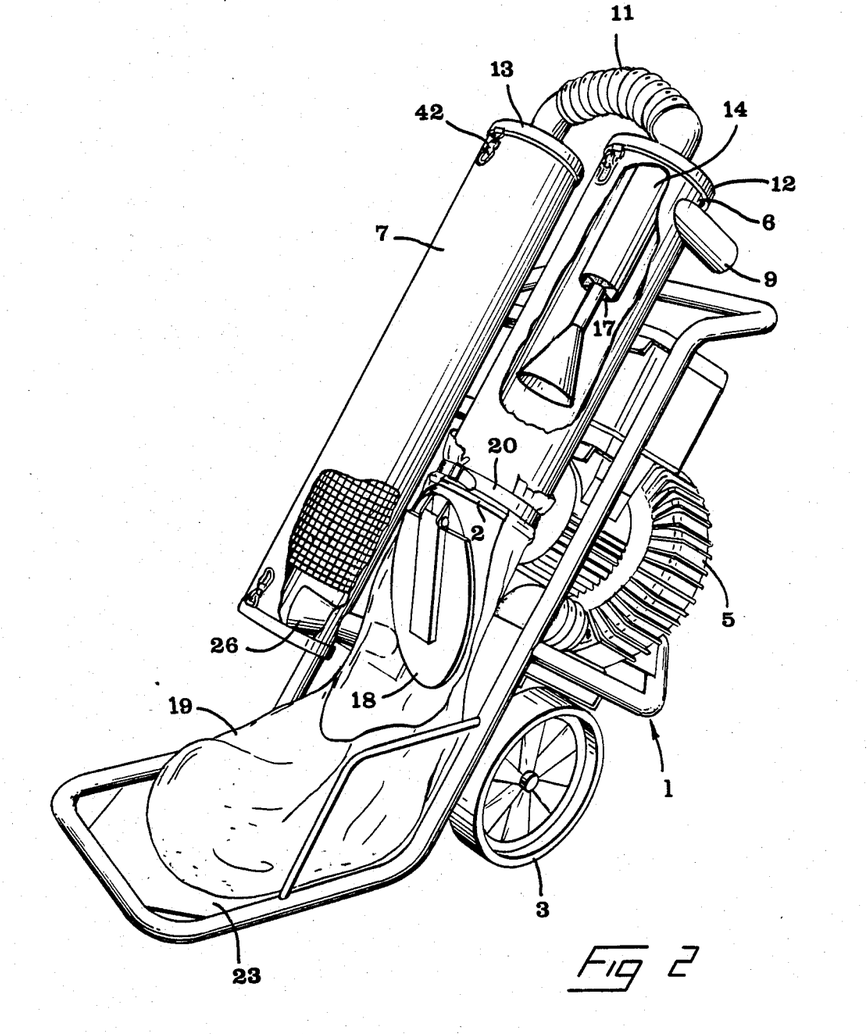
FIG. 2 is a partially cut perspective view of the same assembly seen from behind.

The assembly shown in FIGS. 1 and 2 consist of a mobile unit built up on a chassis generally designated 1, said chassis being supported by two rear wheels 3,3' mounted on a common shaft 2 as well as a front wheel 4. 5 designates a fan which is driven by an electric motor 5' and controlled by an electronic unit 5". On the chassis 1 two casings in the form of tubes 6 and 7 are permanently mounted, a first one of said tubes forming part of a cyclone for pre-separating the coarser components from dust-laden or contaminated air supplied thereto, while the second tube 7 includes a filter unit according to the invention. Said air is sucked into the tube 6 through a hose or flexible tubing (not shown) which at a free end is connected to a suitable suction nozzle and which at the opposite end thereof is connected to a pipe socket 9 running into the tube 6 at the top thereof. According to an important feature said pipe socket extends tangentially in relation to the cylindrical wall of the tube in order to set the incoming air in a circulating motion directed towards the bottom of the tube.

Figure 3:
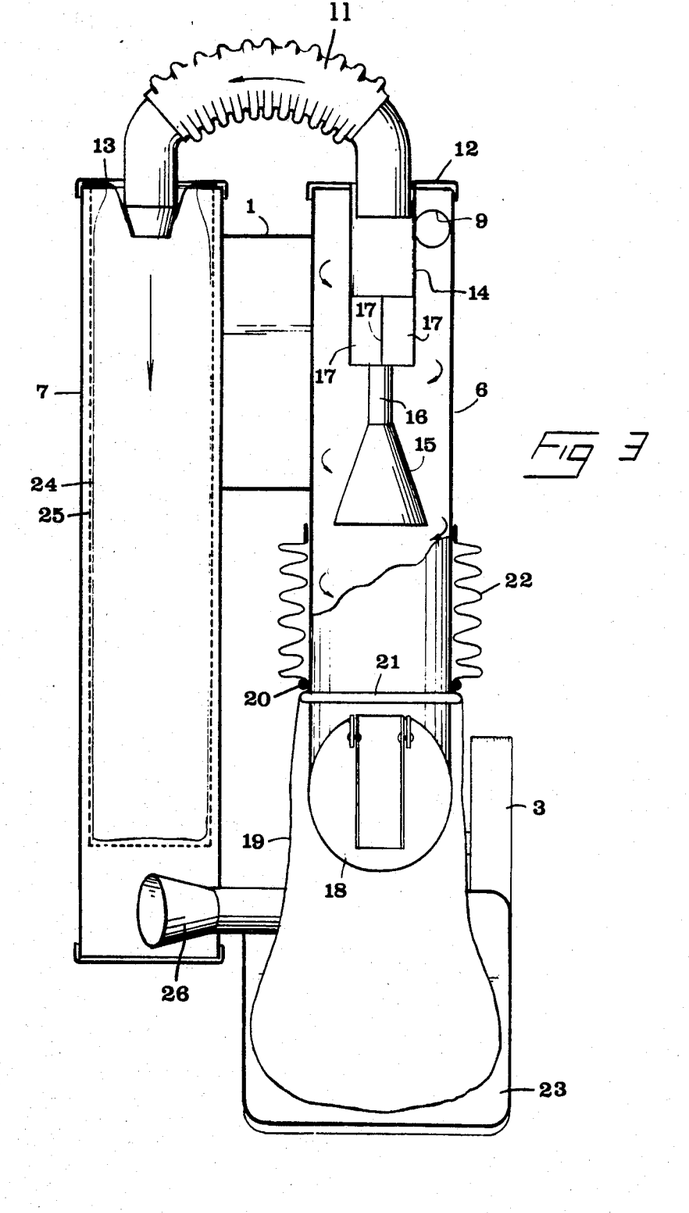
FIG. 3 is a partially cut rear view of the assembly.

Now reference is also made to FIG. 3 which illustrates the interior of the tubes 6,7. A conduit 11 allows communication between the two tubes 6,7. This interconnecting conduit is connected to two caps 12,13 arranged to normally close the upper ends to the tubes. On the inside of the cap 12 the conduit 11 is continued as a pipe socket 14 which projects a certain distance into the surrounding wider tube 6 and which at the lower end thereof supports a conical funnel 15 converging downwardly. More precisely the funnel 15 is supported by means of a pipe 16 having a comparatively small diameter which is connected to the narrow end thereof. At the upper end this pipe is attached to a number of control or guide plates 17 extending radially, said plates being in turn attached to the inside of the pipe socket 14. In practice the widest end of the funnel 15 may have a diameter amounting to 50 to 70% of the diameter of the tube 6, while the pipe 16 may have a diameter amounting to 10 to 20% of the diameter of the tube 6. The ratio between the diameters of the tube 6 and the pipe socket 14 may in turn be in the order of 1.5 to 2.5:1. In absolute figures the diameter of the tube 6 may be 75 to 225 millimeters, and preferably 150 to 170 millimeters. Each tube 6,7 is inclined about 45° in relation to the vertical plane.

The lower end of the tube 6 is obliquely cut, e.g. 45° in relation to the axis of the tube, a flap 18 being pivotely connected to the tube at its upper end. The flap 18 is surrounded by a collecting bag 19, e.g. made of plastics, which is threaded onto the lower part of the tube 6. More precisely the bag 19 is kept in place by means of a belt or rubber band 20 which is applied above a shoulder 21 fixed on the outside of the tube. It should be noted that the portion of the bag 19 that is located above the shoulder 21 may have a considerable length and therefore is folded as shown at 22 in FIG. 3. Hereby the upper part of the bag may be pulled out from the bottom portion of the tube and pinched before it is finally removed from the tube. In this way it is guaranteed that unhealthy dust which is collected in the bottom part of the bag will not escape from the bag when this is removed and changed. As seen from FIGS. 2 and 3 the flexible part of the bag 19 depending from the tube 6 is supported by a tray or plate 23.

The cyclone included in the tube 6 operates in the following manner: Dust-laden air from the hose in question is sucked in with high velocity (20–30 m/s) through the pipe socket 9 which due to its tangential location relative to the tube in a manner known per se sets the air in a circulating motion directed towards the bottom of the tube. At the bottom of the tube a great fraction of the coarser components included in the air is collected and maintained. The accepted air which has been partially relieved of these components and which is driven up from the bottom of the tube in a whirling motion is picked up by the funnel 15 and passes on through the pipe 16 to the orifice of the pipe socket 14. When the air whirl contacts the guide plates 17 these will break the whirl motion so that the flow of the air sucked into the interconnecting conduit 11 will obtain a substantially laminar nature. In pratice it has been seen that a considerable amount of dust is deposited on the inside of the funnel when the accepted air is picked up by the same, whereby also here a pre-separation of dust having varying particle sizes is achieved.

As further appears from FIG. 3 the tube 7 contains a filter unit generally designated 24 as well as a carrier in the form of a rigid net 25 surrounding said filter unit. The filter unit 24 which is suspended at the top portion of the tube 7 is shorter than the tube 7 so as to form at the bottom thereof a space in which, in this embodiment, an intake conduit 26 to the fan 5 is mounted.

Figure 4:
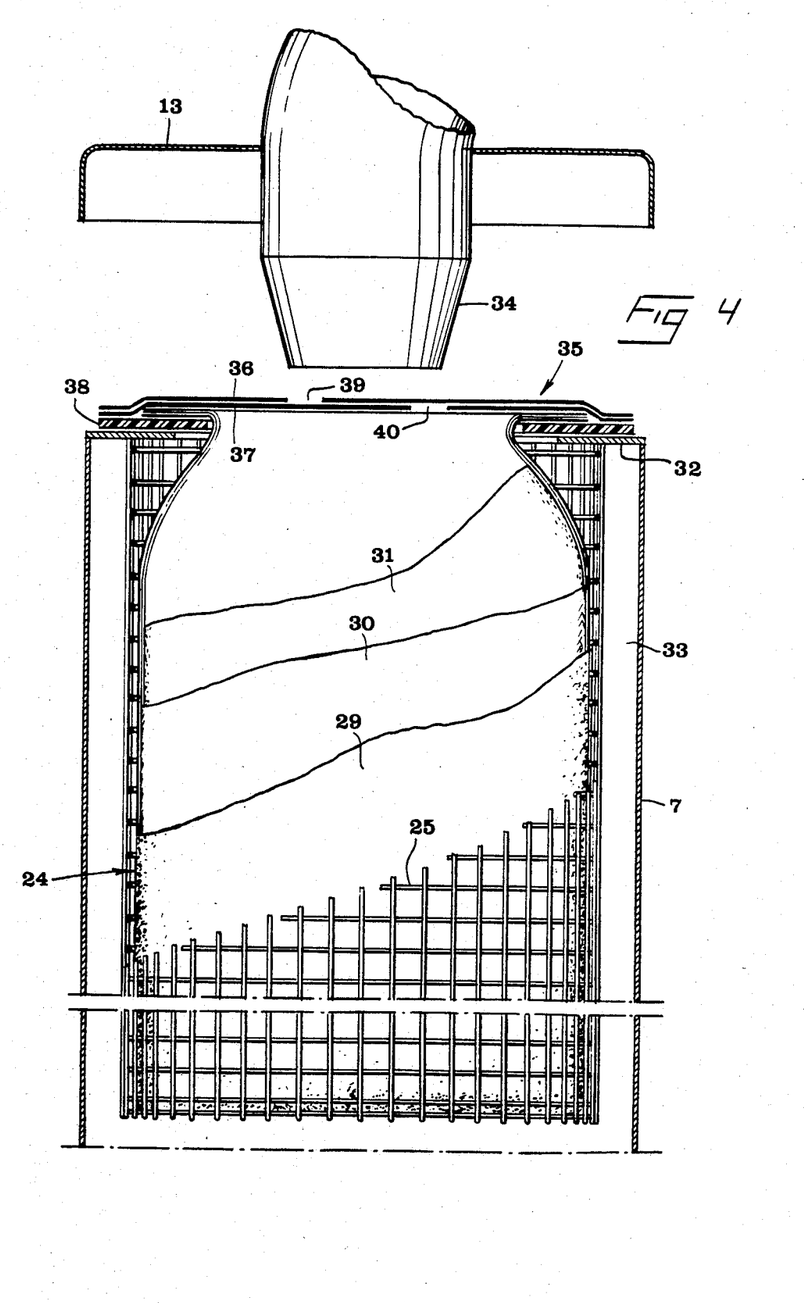
FIG. 4 is an enlarged section through a portion of the filter unit and the tube associated therewith.

Now reference is made to FIG. 4 which in detail illustrates the features of the filter unit 24. Thus this filter unit is composed of three separate elements, namely an exterior bag 29 serving as a fine- or micro-filter, a second bag 30 which is arranged within the bag 29 and which serves as a coarse filter as well as a third interior bag 31 the purpose of which is further described below. In practice the above-mentioned fine filter bag 29 may advantageously consist of cellulose or textile fibres having such a structure that extremely fine pores (down to the order of 0.001 to 0.01 $\mu$m) are formed there between. The thickness of the bag walls may be rather great and amount to 1 to 2 millimeters. The coarse filter bag 30 is in in turn a great deal thinner (preferably the thickness is 0.1 to 0.2 millimeter) and may suitably consist of only cellulose fibres having considerably coarser or wider pores in the fibre network (the pores having a diameter of 0.1 micrometers or more). Finally the inner bag 31 consists of an extremely thin (0.05 to 0.1 millimeters) fibre network composed of cellulose fibres as well as polyester fibres serving as a reinforcement. This fibre network has a loose structure in comparison, with the bag 30 in order to secure that only rather coarse components or particles (having a diameter of 2 to 5 micrometers or more) will be picked up by the bag 31, while the finer particles (down to 0.001 to 0.01 micrometers) will pass on to the filter bags 30 and 29. By the presence of the polyester fibre reinforcement in the walls of the bag 31 an electrostatic action is achieved between the bags 30 and 31, said action improving the capability of the bags to pick up dust or particles from the air passing through and also providing a tendency of the bags in question to at least partially repel from each other. A thin polyester fibre reinforced bag element of the same type as the element 31 may furthermore also be arranged between the bags 29 and 30, though this has not been shown in the drawings.

As appears from FIG. 3 the filter unit 24 has a length which is about 5 times greater than the diameter thereof, meaning that the filtering surface offered by the unit will be many times greater than the sectional area of the tube 7.

The net-shaped carrier or basket 25 in which the filter unit 24 is inserted has, in the embodiment shown, been attached to annular flange 32 extending inwardly from the top end of the tube 7. As appears from FIG. 4 the basket 25 has a diameter which is slightly smaller than the diameter of the tube 7 so as to form between the tube and the basket a narrow annular gap 33 through which the filtered air can pass to the intake conduit 26 of the fan 5. By the presence of the basket 25, which may consist of rigid rods and/or wires of metal or plastics, it is guaranteed that the bags of the unit 24, which are easy to deform, never get an opportunity to contact the inside of the tube 7, which would considerably reduce the air permeation area of the filter unit.

From FIGS. 3 and 4 it further appears that the underside of the cap 13 for the tube 7 presents a pipe socket 34 which is tapered towards the free end thereof and which is intended to project a certain distance into the tube 7. This pipe socket cooperates with bag closing means generally designated 35. In this case said means includes two membranes 36,37 made from an extremely ductile material, e.g. rubber, said membranes being attached, e.g. glued to a rigid collar 38, e.g. made of paper, to which also the free end edges of the bag elements 29,30,31 are glued or attached. In the membranes 36,37 apertures 39,40 are cut which are laterally displaced in relation to each other in such a manner that the aperture 39 is covered by the membrane 37 and vice versa when the membranes are not effected by the pipe socket 34. When this, upon mounting of the cap 13 on the tube 7, penetrates the membranes the apertures 39,40 will be centered relative to the pipe socket and the walls of the membranes will be elastically deformed so as to sealingly contact the outside of the pipe socket as illustrated in FIG. 3. When the cap is once again removed the membranes will immediatly revert to their original shape shown in FIG. 4 in which the apertures 39,40 are covered by the opposite membranes. When the cap is removed an automatic closure of the filter unit 24 is accordingly obtained so as to secure that dust will not escape from the filter unit.

It is also possible to arrange other types of closure means which automatically close the bag or filter unit as soon as the cap and the associated pipe socket are removed from the tube 7 in connection with a substitution of one filter unit for another.

Figure 5:
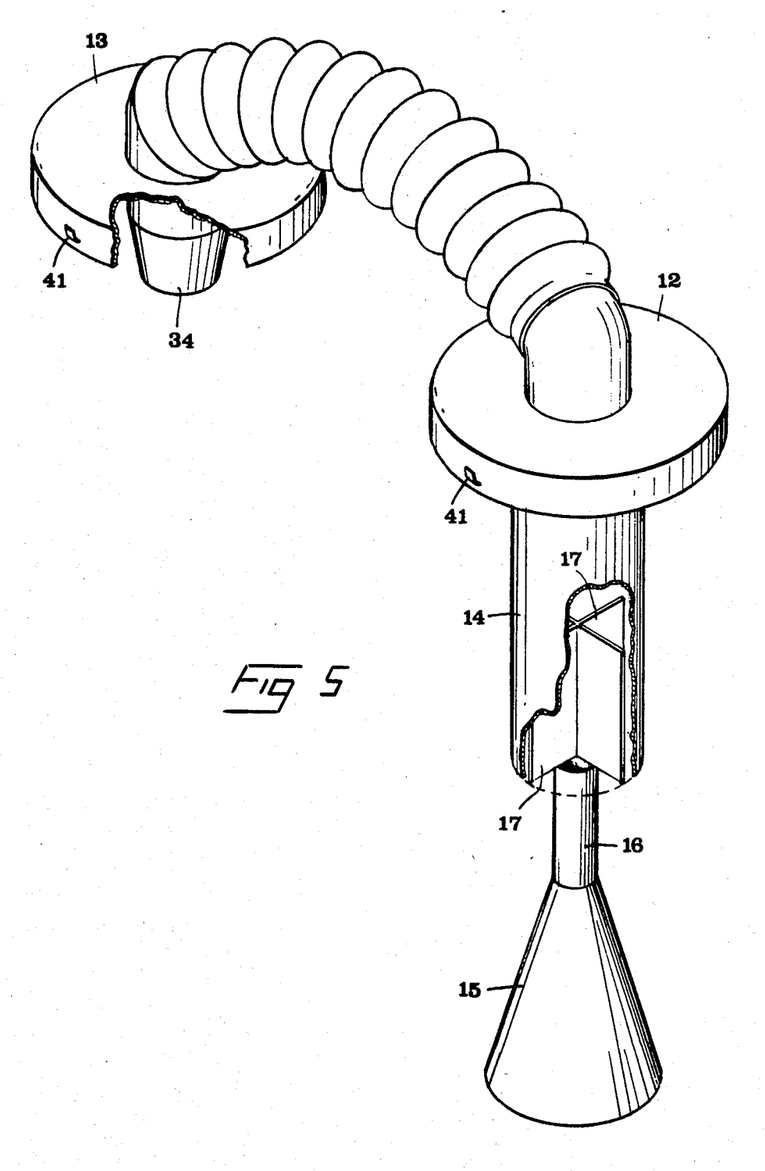
FIG. 5 is an enlarged perspective view of a cap arrangement included in the assembly.

FIG. 5 illustrates how the two caps 12,13 include a suitable number of fastening lugs 41 which cooperate with clamping means 42 (FIG. 2) on the outside of the tubes in order to clamp and lock the caps against the tops of the tubes.

THE FUNCTION OF THE ASSEMBLY ACCORDING TO THE INVENTION

The dust-laden air which by means of the fan 5 is sucked into the tube 6 will upon passage thereof be subjected to the above-mentioned coarse- or pre-separating process which removes the major part of the accompanying coarser components from the air. The accepted air which after passage of through the guide plates 17 has got a laminar flow is sucked through the conduit into the interior of the filter unit 24 and further through the various layers thereof so as to finally, in a filtered condition, be led through the gap 33 and out through the conduit 26 and the fan 5. The accepted air coming in from the cyclone tube and passing through the filter unit 24 is filtered in three different steps, namely (a) upon passage of the polyester fibre reinforced bag 31 which has a loose network structure and which picks up a great fraction of the coarse components of the air still remaining after the pre-separating process in the cyclone tube, (b) upon passage of the coarse filter bag 30 which has a more compact fibre structure and which picks up all the remaining coarse and medium coarse components as well as a certain amount of fine particles, and (c) upon passage of the fine filter bag 29 in which the remaining fine, unhealthy particles (down to 0.001 to 0.01 micrometers) get stuck.

By selecting the layer thickness of the various bags 29,30,31 (e.g. 1.0, 0.2 and 0.1 millimeters respectively) in a suitable way it is possible to guarantee that these are clogged substantially at the same time, meaning that the various bags are utilized to a maximum when the single integral filter unit 24 is thrown away and substituted for a new one.

Figure 6:
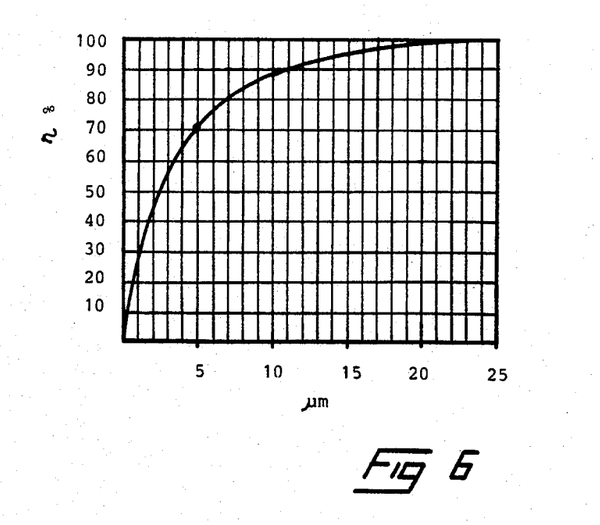
FIG. 6 is a diagram illustrating the separating effect of the cyclone tube.

FIG. 6 illustrates the pre-separating effect of the cyclone 6 on concrete dust having varying particle sizes. The diagram shows that e.g. 70% of all dust particles having a diameter of 5 micrometers or more are pre-separated in the cyclone. Generally all particles below the graph shown are separated from the air in concentrations defined by said graph. Thus it is evident that considerable amounts of particles are separated from the air before this reaches the filter unit 24 in the tube 7.

Figure 7:
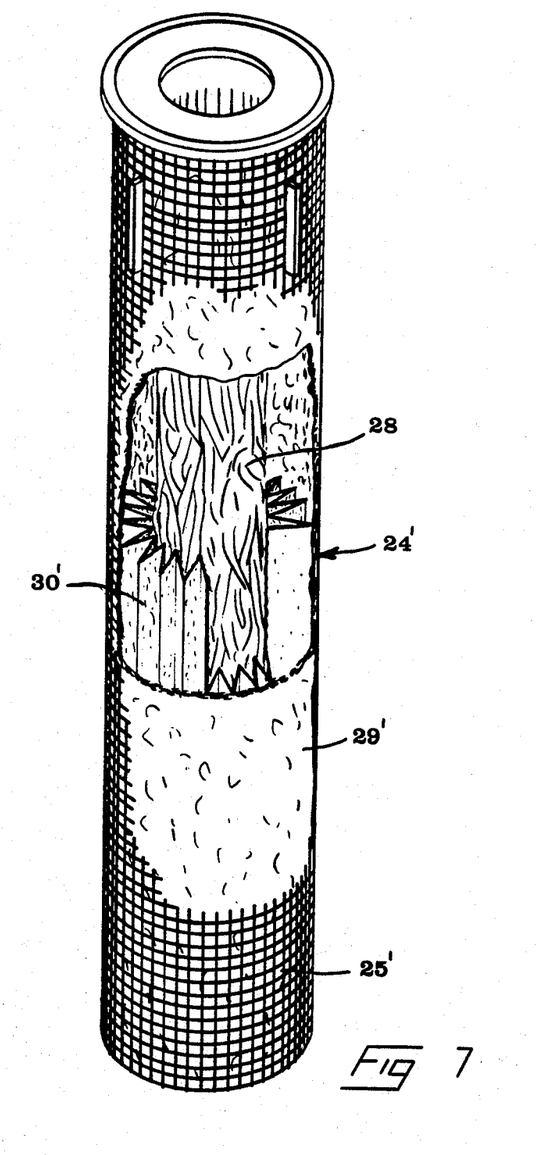
FIG. 7 is a partially cut perspective view showing an alternative embodiment of the filter unit of the assembly.

FIG. 7 illustrates an alternative embodiment of the filter unit which may be mounted in the tube 7. In this case the unit 24' includes a coarse filter layer 30' consisting of a comparatively stiff paper or cardboard which is pleated in order to obtain an enlarged filtering surface. By the fact that this coarse filter is stiff the filter unit in its entirety gets the nature of a shell or case which can be inserted in the tube either with or without the basket 25', since already the stiffness of the layer 30' is sufficient for guaranteeing that the unit will not contact the tube. On the outside of the layer 30' a fine filter layer 29' is provided, said layer having a more compact structure than the material of the layer 30'. In this case the cavity confined within the coarse filter layer 30' is filled with a plurality of irregularly arranged strips 28 (e.g. made of paper) which act as a pre-filter for the air before this reaches the layer 30'. They also act as means for reducing the velocity of the incoming air and devide the air into a number of small partial flows.

The dust collecting assembly described above may sometimes be placed outdoors at the same time as the suction nozzle connected to the assembly through a hose is used to pick up dust or other components indoors. If the temperature outdoors is low, there is a risk that water will condense on the inside of the walls of the tubes 6,7, because in such a case rather warm and humid air from the interior of the building will contact a tube which is comparatively cold. This may lead to detrimental consequences. Thus the air-penetrating capacity of the filter unit 24 will be reduced or even fully spoiled if the unit is saturated with water formed by condensation. Further the cyclone tube 6 may be clogged by condensates and separated solid components together forming a sludge which may freeze to a lump at the bottom of the cyclone tube. Furthermore the emptying flap 18 may freeze stuck and make the emptying of the tube impossible.

Figure 8:
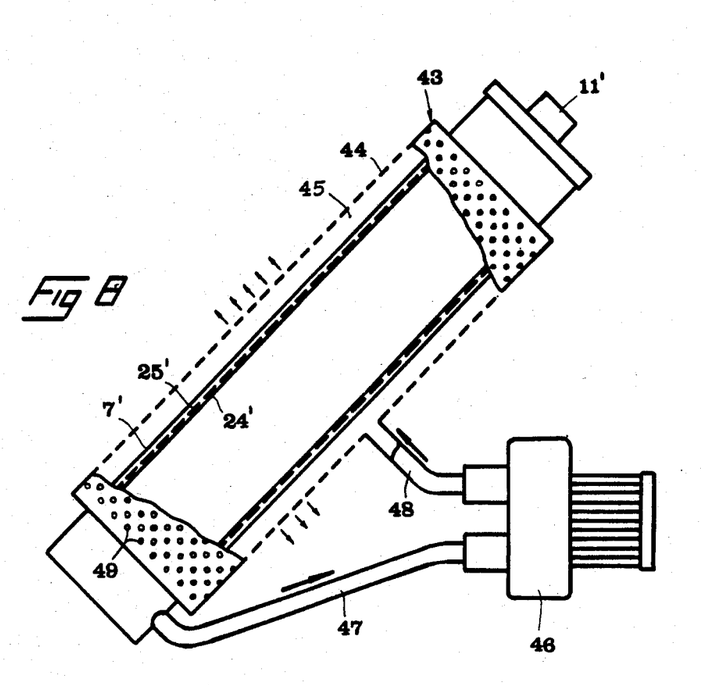
FIG. 8 is a simplified partially cut side-view of an alternative embodiment of the assembly.

FIG. 8 illustrates an embodiment in which the above-mentioned problem is eliminated. The drawing shows a longitudinal section through a filter tube 7' which in the manner described above includes a filter unit 24' composed of a coarse filter element as well as a fine filter element. A cylindrical housing 43 surrounds the tube 7', said housing having a wall 44 the diameter of which is greater than the diameter of the tube so as to form an annular gap or space 45 between the housing and the tube. The fan or suction device 46 is arranged to suck air through the filter unit 24' and out of the tube through a first conduit 47. A first end of a second conduit 48 is also connected to the fan, the opposed end of said conduit being connected to the housing 43. The housing 43 has a plurality of small holes 49 arranged to divide the air passing through the gap 45 into a plurality of small partial flows.

The embodiment of FIG. 8 operates in the following manner: The air which is taken from the cyclone tube 10 into the tube 7' through the interconnecting conduit 11' is purified when it through the filter unit 24' and thereafter it is sucked out of the tube 7' through the conduit 47. When the air passes the fan 46 it is compressed and heated (in practice to about 50° to 65° C.), whereafter the air is passed through the conduit 48 into the housing 43 so as to finally flow out in the open through the holes 49. When the heated air flows through the housing 43 it will at the same time heat the tube 7' while securing that water will not condensate on the inside thereof.

A housing 43 of the above mentioned type may be arranged not only arround the tube 7', but also arround the cyclone tube 6'. The assembly may also be modified by arranging such a housing only arround the cyclone tube 6', but not around the filter tube.

THE ADVANTAGES OF THE INVENTION

The assembly according to the invention is simple, compact and efficient. The change of the neccesary filters can be carried out in a sober and hygienic way at the same time as the number of filter changes per time unit can be reduced to an absolute minimum. Hereby the work of the operator is made rational and by the fact that the filter unit which includes the coarse filter as well as the fine filter is cheaper to produce than previously known separate coarse filters and micro-filters together an extremely good operating economy is achieved. By the fact that the coarse filter and fine filter go together in one unit it is also gained that the operator may rest assured of the health protecting effect of the assembly after a filter change.

CONCEIVABLE MODIFICATIONS OF THE INVENTION

Of course the invention is not merely limited to the embodiments described above and shown in the drawings. Thus the filter unit in question may be mounted not only in tubes, but also in other arbitrary types of casings. The casing and the filter unit may have another geometric shape than the cylindrical one shown and present, for example, a rectangular or otherwise polygonal cross-section. Furthermore, the invention is not restricted to mobile assemblies, since the assembly may also be stationary. It should also be noted that the fan for feeding the air through the assembly does not necessarily have to be placed outside the tubes. Thus it may be located at the bottom of the filter tube. Furthermore the assembly may be equiped with various accessories, such as shaker means for cleaning one or both of the tubes 6,7, a sound damper at the air exhaust, etc.

Finally it should be pointed out that the X-axis of the diagram shown in FIG. 6 indicates the particle size in micrometers, while the Y-axis indicates the degree of separation ($\eta$) in percent.

I claim:

1. A dust collector for collecting dust-laden air containing coarse components as well as medium and fine sized particles, comprising:

(a) a first casing having a tubular wall and top and bottom ends;
   (b) an air intake duct communicating with said first casing, located in the vicinity of said top end and extending tangially in relation to said tubular wall, said air intake duct being arranged for sucking dust-laden air located outside said dust collector into said first casing and projecting such air with a circulating movement downwardly towards said bottom end in the manner of a cyclone, at least the coarse components contained in the dust-laden air being deposited at said bottom end to create pre-purified air that is projected upwardly toward said top end;
   (c) a conical funnel located between said air intake duct and said bottom end, said conical funnel having a maximum outer diameter which is smaller than the inner diameter of said tubular wall so as to define a gap between said funnel and said tubular wall through which the dust-laden air is allowed to pass, said funnel converging upwardly towards said top end, said funnel having a neck of minimum diameter and including a narrow tube connected to said neck;
   (d) a second casing having upper and lower ends and provided with an exhaust outlet;
   (e) an interconnecting conduit connecting the top end of said first casing with the upper end of said second casing, the funnel in said first casing being positioned so that the narrow tube communicates with said interconnecting conduit and passing the pre-purified air flowing up from the bottom end of said first casing into said second casing via said interconnecting conduit; and
   (f) filter means mountable in said second casing for separating particles remaining in the pre-purified air arriving from said first casing, said filter means including first and second shell-like filter elements disposed concentrically relative to each other, said first filter element being on the interior of said second filter element, arranged for first receiving the pre-purified air from said first casing and comprising a relatively coarse filter structure having pores with a diameter of 0.1 micrometers or more, said second filter element comprising a relatively fine filter structure having pores with a diameter between 0.001 and 0.01 micrometers, said first and second filter elements being mountable and dismountable in said second casing as a single integral unit.

2. Dust collector according to claim 1, wherein a housing surrounds at least one of said first and second casings; and further comprising a suction means arranged for sucking air through said filter means; and a conduit connected between said housing and said suction means for conducting air, which has passed through said suction means and thereby been compressed and heated, into said housing so as to heat the casing surrounded by said housing and thereby counteract any condensation of water on the inside such casing.

3. Dust collector according to claim 1, wherein said interconnecting conduit projects into said first casing and is arranged to support said conical funnel; and further comprising a plurality of control plates extending within said interconnecting conduit in the length direction thereof, said control plates being arranged for breaking the circulating movement of air coming into said funnel and for producing a laminar movement of the air before the air reaches said second casing.

4. Dust collector according to claim 3, wherein said second casing has an inner surface; and further comprising a substantially rigid carrier having a plurality of large-sized air-permeable holes and being placed within said second casing for supporting said filter means at a distance from the inner surface of said second casing.

5. Dust collector according to claim 3, wherein said filter means includes means for automatically closing said filter means in connection with a dismounting of said filter means from said second casing.

6. Dust collector according to claim 5, and further comprising a cap for closing the upper end of said second casing, said cap including a pipe socket projecting into said second casing, said filter means having an end facing said cap which comprises a stiff collar and two membranes of a ductile material which are attached to said stiff collar and in which apertures are cut out, said apertures being laterally displaced relative to each other in such a manner that a first one of said membranes, in an undeflected condition, covers the aperture in the second one of the membranes and vice versa, said pipe socket penetrating through the two apertures when said cap is mounted on said second casing so as to deform said membranes elastically while sealingly contacting the outside of said pipe socket, said membranes reverting to their covering condition as soon as said pipe socket is pulled out of said apertures.

7. Dust collector according to claim 3, wherein a housing surrounds at least one of said first and second casings; and further comprising a suction means arranged for sucking air through said filter means; and a conduit connected between said housing and said suction means for conducting air, which has passed through said suction means and thereby been compressed and heated, into said housing so as to heat the casing surrounded by said housing and thereby counteract any condensation of water on the inside of such casing.

8. Dust collector according to claim 7, wherein said housing includes a plurality of small holes for dividing the air fed into said housing into a great number of small partial flows before the passage of the air to the exterior of said housing.

9. Dust collector according to claim 7, wherein said housing includes a plurality of small holes for dividing the air fed into said housing into a great number of small partial flows before the passage of the air to the exterior of said housing.

10. Dust collector according to claim 1, wherein said second casing has an inner surface; and further comprising a substantially rigid carrier having a plurality of large-sized air-permeable holes and being placed within said second casing for supporting said filter means at a distance from the inner surface of said second casing.

11. Dust collector according to claim 10, wherein said filter means includes means for automatically closing said filter means in connection with a dismounting of said filter means from said second casing.

12. Dust collector according to claim 11, and further comprising a cap for closing the upper end of said second casing, said cap including a pipe socket projecting into said second casing, said filter means having an end facing said cap which comprises a stiff collar and two membranes of a ductile material which are attached to said stiff collar and in which apertures are cut out, said apertures being laterally displaced relative to each other in such a manner that a first one of said membranes, in an undeflected condition, covers the aperture in the second one of the membranes and vice versa, said pipe socket penetrating through the two apertures when said cap is mounted on said second casing so as to deform said membranes elastically while sealingly contacting the outside of said pipe socket, said membranes reverting to their covering condition as soon as said pipe socket is pulled out of said apertures.

13. Dust collector according to claim 10, wherein a housing surrounds at least one of said first and second casings; and further comprising a suction means arranged for sucking air through said filter means; and a conduit connected between said housing and said suction means for conducting air, which has passed through said suction means and thereby been compressed and heated, into said housing so as to heat the casing surrounded by said housing and thereby counteract any condensation of water on the inside of such casing.

14. Dust collector according to claim 13, wherein said housing includes a plurality of small holes for dividing the air fed into said housing into a great number of small partial flows before the passage of the air to the exterior of said housing.

15. Dust collector according to claim 1, wherein said filter means includes means for automatically closing said filter means in connection with a dismounting of said filter means from said second casing.

16. Dust collector according to claim 15, and further comprising a cap for closing the upper end of said second casing, said cap including a pipe socket projecting into said second casing, said filter means having an end facing said cap which comprises a stiff collar and two membranes of a ductile material which are attached to said stiff collar and in which apertures are cut out, said apertures being laterally displaced relative to each other in such a manner that a first one of said membranes, in an undeflected condition, covers the aperture in the second one of the membranes and vice versa, said pipe socket penetrating through the two apertures when said cap is mounted on said second casing so as to deform said membranes elastically while sealingly contacting the outside of said pipe socket, said membranes reverting to their covering condition as soon as said pipe socket is pulled out of said apertures.

17. Dust collector according to claim 16, wherein a housing surrounds at least one of said first and second casings; and further comprising a suction means arranged for sucking air through said filter means; and a conduit connected between said housing and said suction means for conducting air, which has passed through said suction means and thereby been compressed and heated, into said housing so as to heat the casing surrounded by said housing and thereby counteract any condensation of water on the inside of such casing.

18. Dust collector according to claim 17, wherein said housing includes a plurality of small holes for dividing the air fed into said housing into a great number of small partial flows before the passage of the air to the exterior of said housing.

19. Dust collector according to claim 15, wherein a housing surrounds at least one of said first and second casings; and further comprising a suction means arranged for sucking air through said filter means; and a conduit connected between said housing and said suction means for conducting air, which has passed through said suction means and thereby been compressed and heated, into said housing so as to heat the casing surrounded by said housing and thereby counteract any condensation of water on the inside of such casing.

20. Dust collector according to claim 19, wherein said housing includes a plurality of small holes for dividing the air fed into said housing into a great number of small partial flows before the passage of the air to the exterior of said housing.

* * * * *